W. H. GRIFFIN AND O. C. HARTSOUGH.
CONVERTIBLE INTERIOR OF AUTOMOBILE.
APPLICATION FILED DEC. 20, 1919.
1,353,232.
Patented Sept. 21, 1920.
5 SHEETS—SHEET 1.
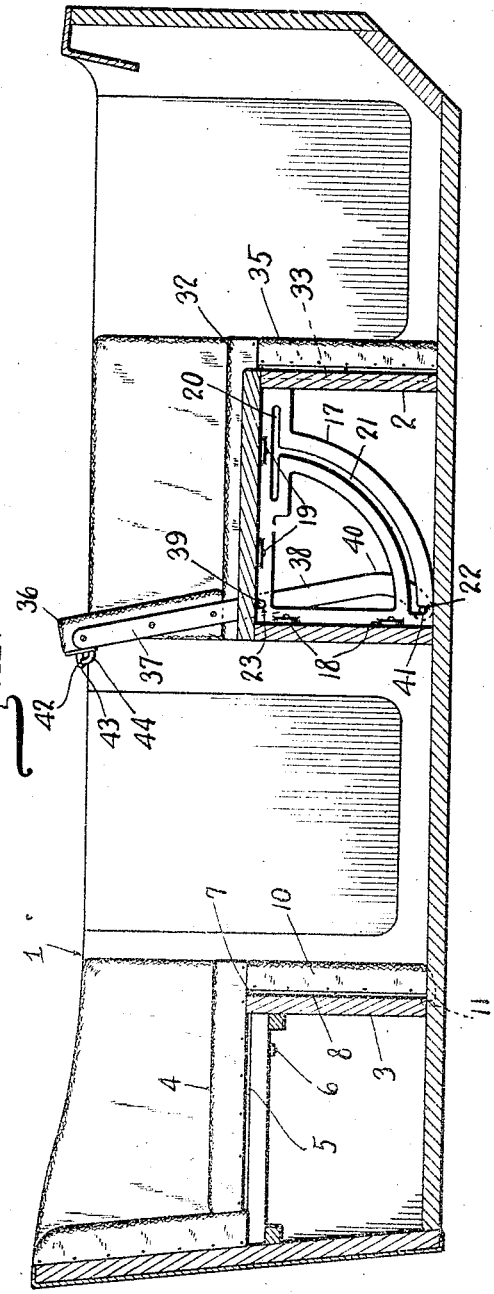
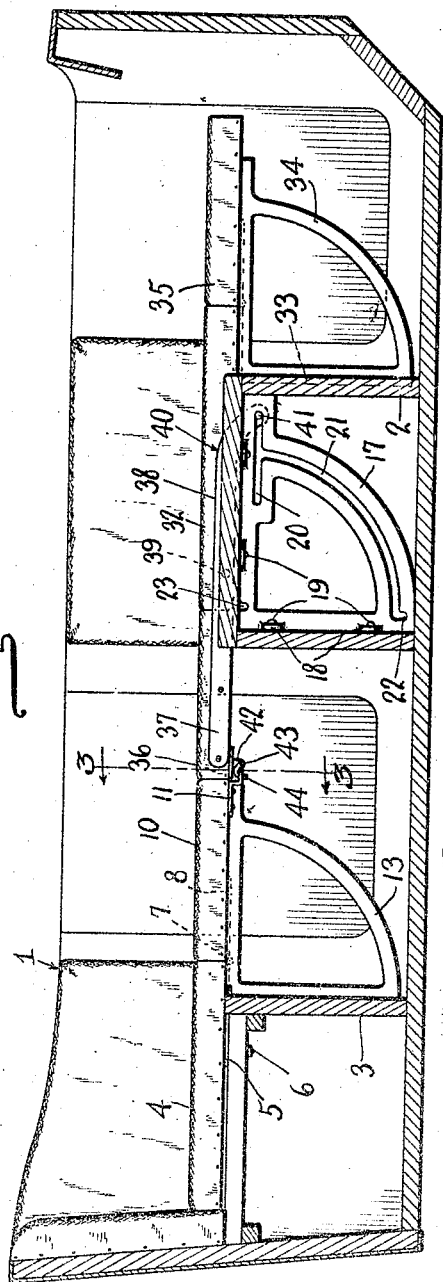
WITNESS
L. B. James
INVENTORS
William H. Griffin &
Oliver C. Hartsough
BY
Victor J. Evans ATTORNEY.

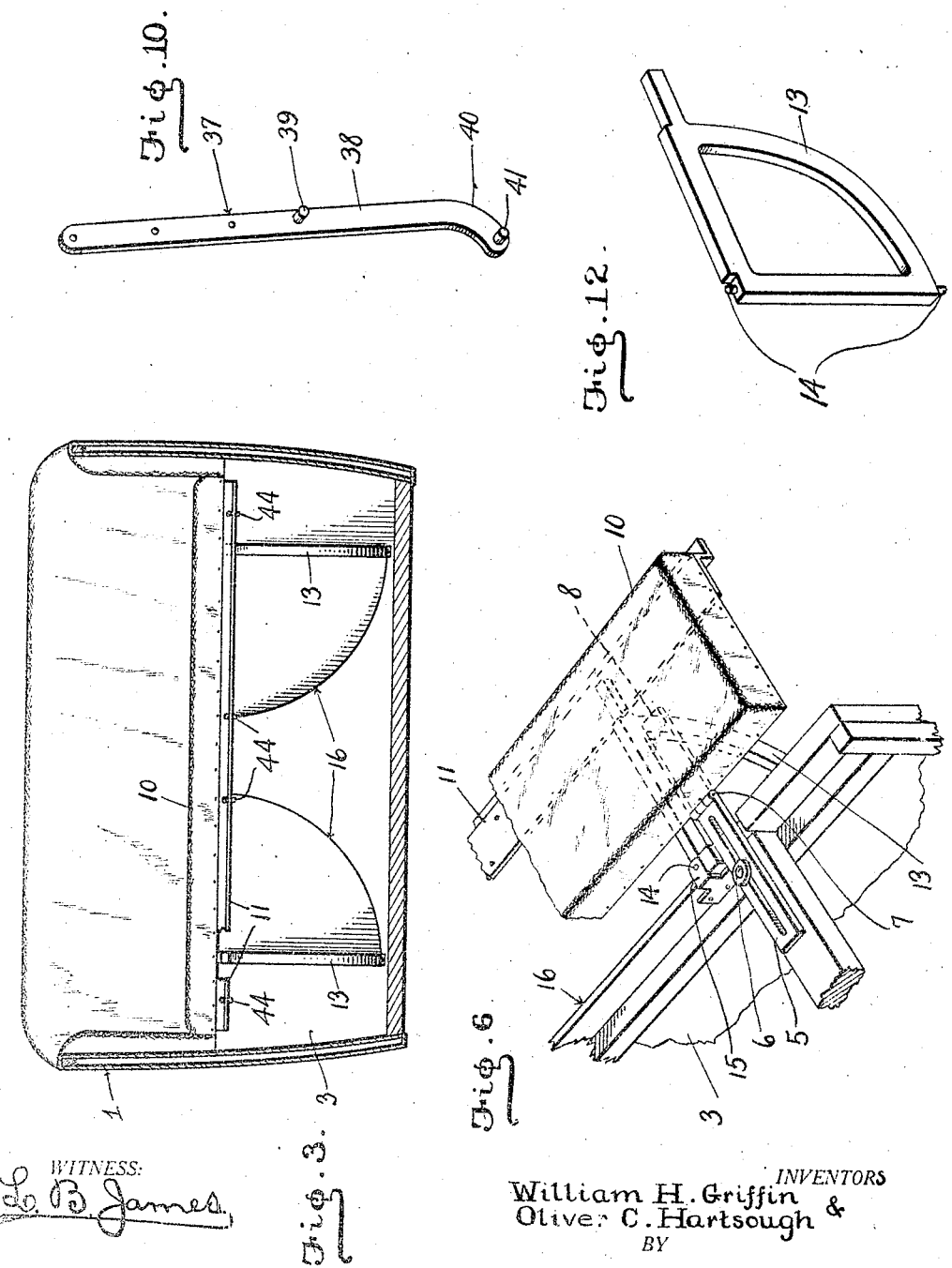

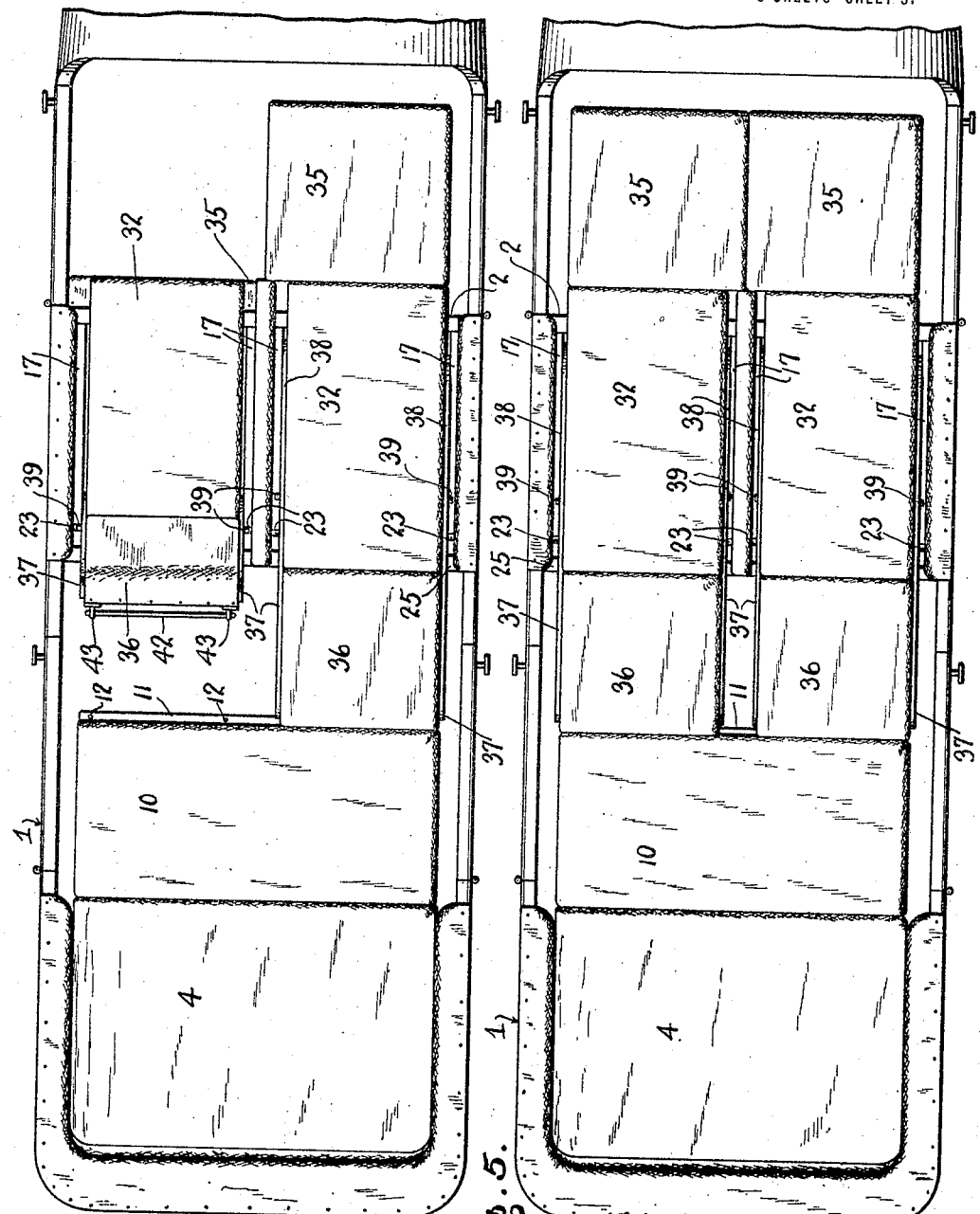

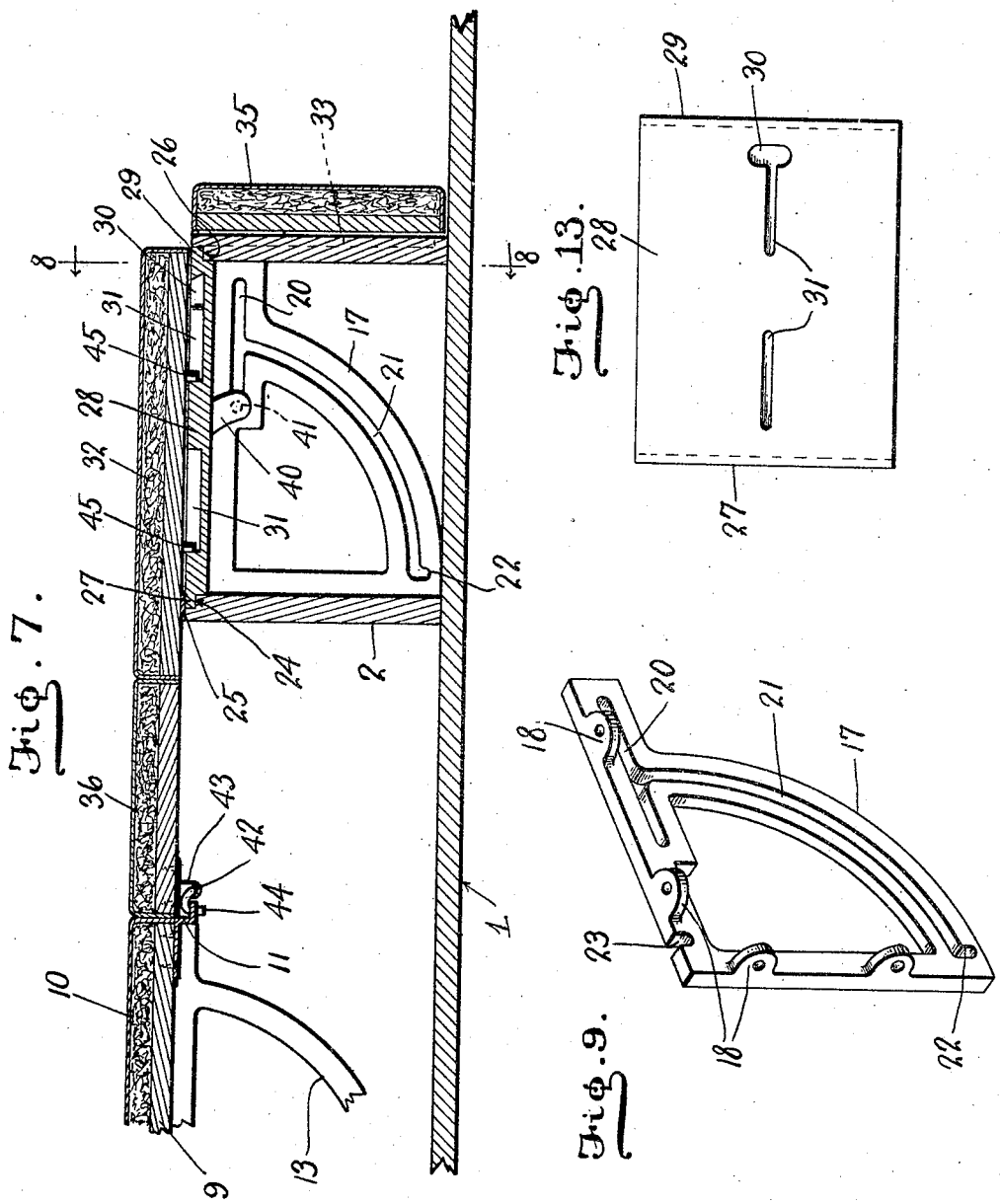

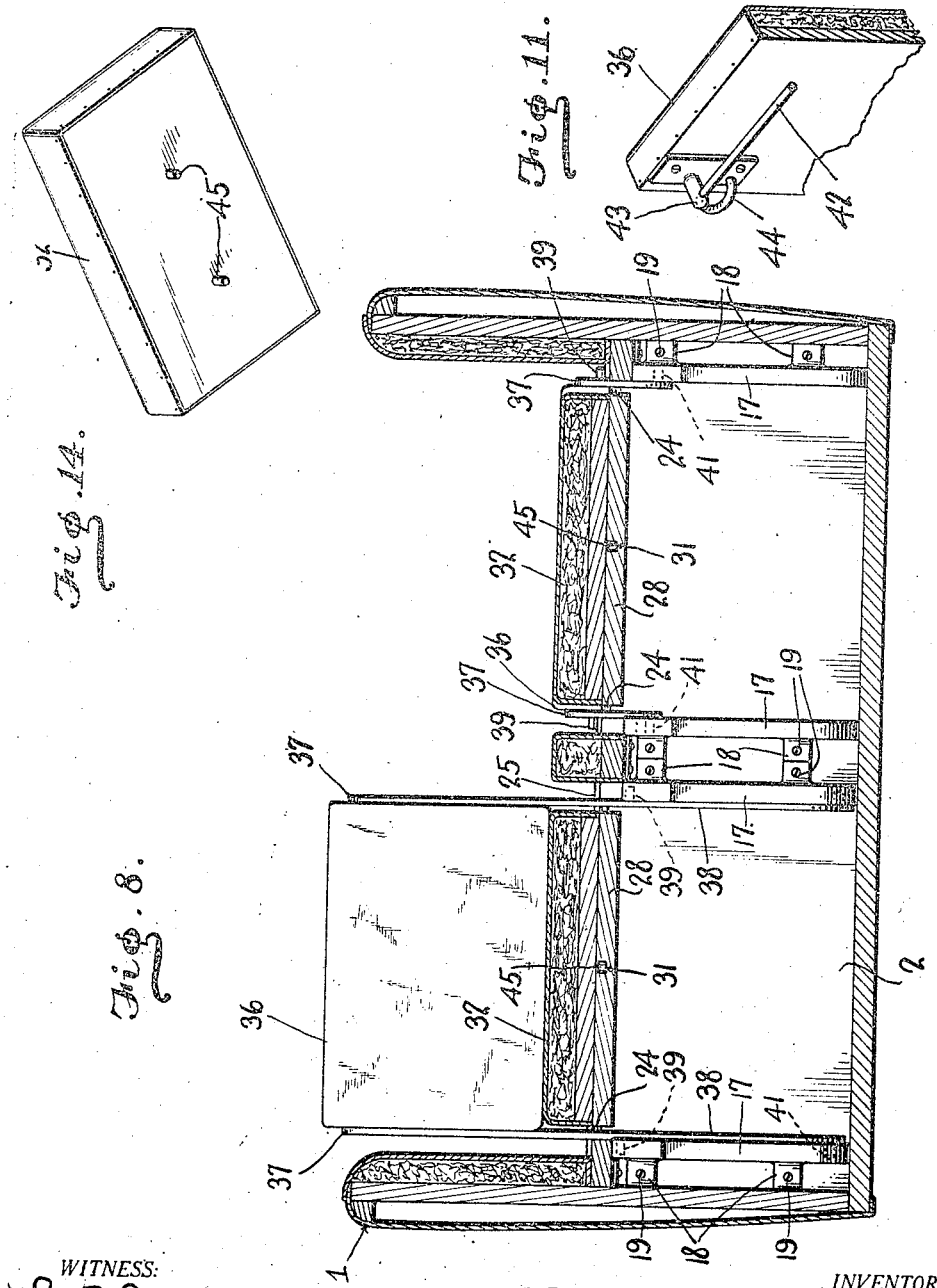

UNITED STATES PATENT OFFICE.

WILLIAM H. GRIFFIN AND OLIVER C. HARTSOUGH, OF CANTON, OHIO.

COVERTIBLE INTERIOR OF AUTOMOBILES.

1,353,232.　　　　　Specification of Letters Patent.　　Patented Sept. 21, 1920.

Application filed December 20, 1919. Serial No. 346,280.

*To all whom it may concern:*

Be it known that we, WILLIAM H. GRIFFIN and OLIVER C. HARTSOUGH, citizens of the United States, residing at Canton, in the county of Stark and State of Ohio, have invented new and useful Improvements in Convertible Interiors of Automobiles, of which the following is a specification.

This invention has reference to an improvement in automobiles or like vehicles.

The primary object of the invention is to so arrange the seats of an automobile or like vehicle that the same may be positioned and supported to provide a bed or couch, and thus transform the interior of the vehicle into an ambulance or into a sleeping compartment.

A further object of the invention is to provide at the front of the rear seat, and, if necessary, at the front of the forward seat an apron hinged to the seat frames in such a manner as to permit of the same being drawn outwardly a distance equaling the projecting ends of the seat cushions and then swung to and supported in a horizontal position, the backs of the front seats being so associated with the supporting frames therefor as to permit of the same being swung rearwardly in a line with and having their rear ends supported by suitable elements on the apron of the rear seat, whereby to convert the automobile into an ambulance or sleeping compartment.

It is a still further object of the invention to produce a device of this character which shall be of an adjustable nature, so that the same may be installed in automobiles or other vehicles of different lengths and widths.

It is a still further object of the invention to produce a device of this character wherein a portion or the whole of the interior of an automobile may be converted into a sleeping space or bed.

The foregoing and other objects which will appear as the nature of the invention is better understood, may be accomplished by a construction, combination and operative arrangement of parts, such as is illustrated by the drawings, it being understood, however, that the nature of the invention necessarily renders the same susceptible to modifications, all of which falling within the scope of what is claimed.

In the drawings:

Figure 1 is a vertical longitudinal sectional view through the body portion of an automobile or like vehicle provided with the improvement.

Fig. 2 is a similar view but showing the parts in position as when the vehicle is employed as a bed or ambulance.

Fig. 3 is a sectional view approximately on the line 3—3 of Fig. 2.

Fig. 4 is a plan view of the device as illustrated in Fig. 2 with the back of the driver's seat in its normal position, illustrating how a patient may be positioned in the machine when the same is employed as an ambulance.

Fig. 5 is a similar plan view, but showing the driver's seat folded to horizontal position, as when the interior of the device is used as a bed.

Fig. 6 is a detail perspective view illustrating the hinge connection between one of the aprons and one of the seat frames.

Fig. 7 is a detail side elevation showing the back of one of the front seats swung to horizontal position and illustrating the manner in which the seat may be adjusted toward or away from the seat frame, the latter being in section.

Fig. 8 is a transverse sectional view approximately on the line 8—8 of Fig. 7.

Fig. 9 is a perspective view of the frame reinforcing bracket for the back of the front seat.

Fig. 10 is a similar view of one of the back plate members of one of the front seats.

Fig. 11 is a fragmentary perspective view of a portion of one of the back members of the front seats.

Fig. 12 is a detail perspective view of one of the pivoted supporting brackets for the hinged aprons.

Fig. 13 is a detail plan view of the cover for the box frame of one of the front seats.

Fig. 14 is a similar view looking toward the under face of one of the front cushions.

It will be apparent as the nature of the construction is set forth in detail that the improvement may be employed on various classes of vehicles of varying sizes and proportions.

In the drawings the numeral 1 designates the body portion of an automobile which is provided with the usual front and rear boxlike seat frames 2 and 3 respectively. On the rear seat frame 3 rests the usual upholstered seat or cushion 4. On the transverse members that connect the front and rear boards of the rear seat frame, and which are usually positioned adjacent to the ends of the said frame, rest slotted leaf members 5. Through the slits of these members pass the shanks of headed elements 6, whereby the said leaf members or plates 5 may be moved longitudinally inwardly or outwardly of the frame 3. The outer ends of the leaf members or plates 5 have hingedly secured thereto, as at 7, other leaves or plates 8. These plates are secured to the inner frame portion 9 of an apron 10. The apron is upholstered in the same manner as the seat cushion 4 and has, at its outer or lower end a longitudinally extending offset lip 11. The lip is preferably of a length equaling that of the apron and is provided at spaced intervals with apertures 12. As is usual, the outer edge of the seat cushion 4 is projected a suitable distance beyond the outer member of the seat frame 3, so that this projecting portion normally covers the upper edge of the apron when the latter is in its normal vertical position and resting against the outer member of the frame. When it is desired to swing the apron to horizontal position to bring the same into alinement with the seat cushion 4, the slotted leaves or plates permit of the said apron being drawn outwardly of the frame and when the same clears the projecting end of the seat cushion allows the said apron to be swung in an upward direction. The cushion is supported in its horizontal position by a pair of brackets 13, which have one of their ends formed with trunnions 14 that are received in suitable bearing members 15. The front board of the frame 3 is formed with depressions 16 to receive the swinging brackets 13 when the latter are in inoperative position, and the upper straight edges of the brackets are designed to contact with the inner edges of the plates or leaves 8 when the same are swung outwardly to apron supporting position.

The box-like front seat frame 2 may be divided into two compartments, or at any event there are arranged therein four bracket members of a particular and peculiar construction which will be described in detail. These brackets, 17, are arranged in spaced pairs and are preferably provided with offset ears 18 through which pass fastening elements 19 that secure the brackets to the rear and to the top transverse bars of the frame 2. In addition to this, the outer ends of the brackets contact with the front board of the frame 2 and may be secured thereto, if desired. It will thus be noted that the brackets materially reinforce the front box-like frame 2. As each of the brackets is of a similar construction, the detailed explanation of one will be taken as equally applicable to the remainder. Each of the brackets has at its upper portion a longitudinal slot 20, and communicating with the said slot at approximately the center thereof is a downwardly extending rearwardly directed slot or passage 21. This arcuate slot or passage terminates adjacent to the lower and inner end of the bracket, and the said bracket at its said lower and inner end is formed with a notch 22 that communicates with the lower wall provided by the arcuate slot 21. The upper edge of each of the brackets, approximately in a line with or slightly forward of the notch 22 is similarly notched as at 23. Between each pair of brackets the rear board of the front seat frame 2 is formed with a longitudinal depression 24 that is covered by a plate 25 secured to the upper edge of the said rear board or member of the frame. In addition to this, the front board has its inner corner formed with a depression 26. The plate 25 and the depression 24 form a pocket for the inner lipped end 27 of a cover board 28, while the depression 26 is designed to receive therein the outer lipped portion 29 of the said board 28. Of course, two of the boards 28 are employed, each of the said boards, upon its outer face and adjacent its outer edge is formed with a depression 30 that serves as a finger pocket for the removal of the board when access to the compartments in the box-like frame is desired. Each of the boards 28 is provided with two alining spaced longitudinal slots 31—31, the purpose of which will presently be apparent. The cover boards 28 provide rests for the cushions 32 of the front seats.

The outer board or member of the front seat frame 2 may be provided with spaced depressions 33 within which are normally housed pivoted brackets 34. These brackets are of a similar construction to the pivoted supporting brackets 13, and are designed to serve as supports for the spaced hinged aprons 35—35, which are attached to the front seat frame in a manner similar to that in which the apron 10 is attached to the rear seat frame.

The back members for the front seats are indicated by the numerals 36. To the sides of the backs 36 are secured plates 37. These plates are provided with extensions which, for the sake of convenience will be termed arms and which also for distinction are indicated by the numerals 38. The inner arm for each of the back members 36 is offset from the plate to which it is connected, so as to bridge the central partition in the box frame 2, or when such partition is not employed to bridge the inner pair of brackets 34. The arms, at a suitable distance outward of the back members 36 have outwardly extending lugs 39 thereon, and the outer ends of the said arms are curved or rounded upon themselves, as indicated by the numerals 40. These rounded ends are each provided with an outstanding lug 41. and the last mentioned lugs are received in the slots of the respective brackets 17, and when the backs are in their normal upright position, in the notches 22 at the lower ends of the brackets. When in this position the lugs 39 are received in the notches 23 at the upper edges of the said brackets, so that the backs 36 are thus effectively sustained in their normal position. When the backs 36 are raised to bring the lugs of the arms 38 out of the notches in the brackets the backs may be tilted, permitting the arms to rest on the plates 25 and allowing the lower lugs 41 to travel through the arcuate slots 21 in the brackets until the same are brought into the longitudinal, or other horizontal slots 20 of the said brackets. The backs may be moved longitudinally to permit of the lugs resting on the lower walls provided by the slots 20 to either side of the arcuate slot 21, and as a consequence the backs may be thus adjusted with respect to the box frame 2. The arms at all times rest on the rear board of the frame, or rather on the plate 25 that is secured to the upper edge of the said rear wall, and consequently the backs are firmly supported when arranged horizontally.

On the rear edge of the backs 36 is a coat hanger rod 42. The rod adjacent the ends thereof is mounted in suitable bearings 43 which may be in the nature of studs that have body plates secured directly to the back. The rods outward of the said studs are bent upon themselves to provide hook portions 44. It should be stated that the outer ends of the hinged supporting brackets for the apron 10 are arranged in contacting position with the offset portion of the lip 11, so that the rear apron is thus held against inward movement with respect to the rear seat frame. The back members 36 are designed to rest on the lip when the said back members are brought in horizontal alinement therewith, and when in such position the rods 42 are turned to permit of the hooked ends 44 thereof being received in the apertures 12 of the lip 11, and in this manner the backs are locked to the rear apron.

The bottom board of each of the front cushions 32 is provided with spaced alining lugs 45 that are designed to be received in the slots 31 of the cover boards 28. This holds the cushions against lateral movement with respect to the supporting frame 2 but permits of a limited longitudinal movement thereof so that the said cushion members may be brought to have one of their ends contacting with the inner end of the back members 36. The adjustable hinge connection between the front aprons 35 and the seat frames allow the said aprons to be moved in contacting engagement with the outer edges of the cushions 32, and as a consequence a perfectly straight horizontally disposed sleeping surface or bed is provided when the parts of the construction are arranged as just described. When the device is to be used as an ambulance for a single patient it is not necessary to swing the driver's seat to a horizontal position, but the back of the other front seat is swung horizontally and is locked to the apron of the rear seat. This arrangement allows almost the usual space between one of the rear doors and the body of the automobile for arranging the patient in the machine and on the cushions and likewise for removing the patient. It will thus be noted that all of the elements are moved or brought to horizontal alinement only when the interior of the automobile is required for sleeping purposes.

Having described the invention, what we claim is:

1. A convertible vehicle body including front and rear seats, aprons hingedly connected to the front faces of the rear seats and susceptible to movement outward from said seats, hinged brackets carried by the front members of the seats and designed when swung outwardly to support the aprons when the latter are swung horizontally, an apertured lip on the outer end of the rear apron, the back members for the front seats being swingingly associated therewith whereby the said backs may be swung rearwardly and rest on the lip of the rear apron, and swinging hook members carried by said backs for engaging in the apertures of the lip.

2. A convertible vehicle body including front and rear seats, aprons hingedly connected to the front faces of the rear seats, means for supporting the aprons when the latter are swung horizontally, reinforcing brackets for the frame front seats having upper horizontal slots, outwardly curved slots communicating therewith, notches at the lower ends of the last mentioned slots and notches on the upper edges of the brackets, the back members for the front seats having depending arms at the sides thereof provided with outstanding studs, the said studs designed to be received in both of the notches when the backs are in normal upright position, and the lower stud designed to travel through the curved slot on to the wall of the horizontal slot when the backs are swung to horizontal position, and means for locking the backs to the rear aprons when these members are in horizontal alinement.

3. A convertible vehicle body including front and rear seats, aprons hingedly connected to the front faces of the rear seats, means for supporting the aprons when the latter are swung horizontally, reinforcing brackets for the frame front seats having upper horizontal slots, outwardly curved slots connected therewith, the back members for the front seats having depending arms at the sides thereof provided with outstanding studs designed to travel through the curved slots on to the walls of the horizontal slots, means for normally holding the back members in upright position and means for locking the back members to the rear aprons when these members are in horizontal alinement.

4. A convertible vehicle body including front and rear seats, leaves slidably connected thereto, aprons hingedly connected to said leaves, means for supporting the aprons when the latter are swung horizontally, back members for the front seats, means for swinging the said back members into horizontal position, means for moving the back members longitudinally when in horizontal position, means for locking the back members to the rear aprons when the back members are in horizontal alinement and means for sliding the front seats longitudinally to engage the back members, the leaves of the front aprons being arranged to be moved longitudinally to bring the front aprons into engagement with the front seats when said front aprons are in the horizontal position.

In testimony whereof we affix our signatures.

WILLIAM H. GRIFFIN.
OLIVER C. HARTSOUGH.